United States Patent [19]

Stutz et al.

[11] 4,208,507
[45] Jun. 17, 1980

[54] POLYURETHANE-UREA ELASTOMERS AND THEIR PRODUCTION

[75] Inventors: Herbert Stutz, Karlsruhe; Karl H. Illers, Otterstadt; Ludwig Schuster, Limburgerhof, all of Fed. Rep. of Germany

[73] Assignee: BASF Aktiengesellschaft, Fed. Rep. of Germany

[21] Appl. No.: 922,317

[22] Filed: Jul. 6, 1978

[30] Foreign Application Priority Data

Jul. 14, 1977 [DE] Fed. Rep. of Germany ....... 2731815

[51] Int. Cl.² .................... C08G 18/32; C08G 18/75
[52] U.S. Cl. ...................................... 528/64; 528/67; 528/75; 528/76
[58] Field of Search .................................. 528/64, 67

[56] References Cited

U.S. PATENT DOCUMENTS 3,428,610  2/1969  Klebert .................................. 528/64

Primary Examiner—H. S. Cockeram
Attorney, Agent, or Firm—Keil & Witherspoon

[57] ABSTRACT

Polyurethane-urea elastomers with improved temperature characteristics, in particular improved low temperature properties, good mechanical properties over a large temperature range and excellent resistance to hydrolysis, are obtained by reacting (A) a prepolymer, possessing cycloaliphatic NCO groups, which has been prepared from essentially difunctional polyhydroxy compounds and organic diisocyanates possessing at least one NCO group bonded to a cycloaliphatic structure, these reactants being used so as to give a ratio of total hydroxyl: NCO groups of from 1:1.2 to 1:10, with (B) 3,3′,5,5′-tetramethyl-4,4′-diamino-diphenylmethane, A and B being reacted in the molar ratio of from 1:0.8 to 1:1.2.

4 Claims, 1 Drawing Figure

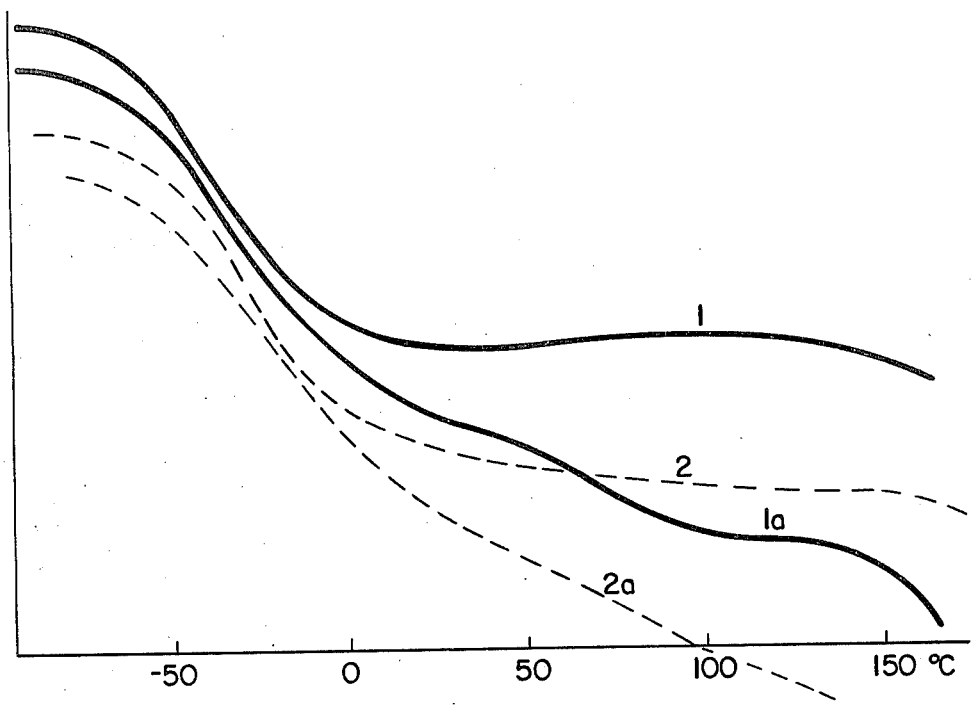

POLYURETHANE-UREA ELASTOMERS AND THEIR PRODUCTION

The present invention relates to polyurethane-urea elastomers having improved temperature characteristics, which elastomers are prepared from prepolymers possessing NCO groups bonded to a cycloaliphatic structure and 3,3',5,5'-tetramethyl-4,4'-diaminodiphenylmethane, and to a process for their production.

The preparation of polyurethane-urea elastomers by reacting a prepolymer possessing terminal isocyanate groups with an approximately equivalent amount of a diamine has been known for a long time. Amongst the aromatic diamines of low reactivity which can be used for this purpose, it is above all 3,3'-dichloro-4,4'-diaminodiphenylmethane, commercially available under the registered tradename Moca, which has proved successful, since the elastomers prepared therefrom have a particularly balanced pattern of properties.

Since polyurethane-urea elastomers are employed as engineering plastics in many fields, their high temperature and low temperature behavior is a decisive factor in their usefulness. The use temperature range of an elastomeric engineering plastic is in the main determined by the temperature dependence of the modulus in the elastomeric range, on which a lower limit is imposed by transition to a glassy state and an upper limit by the softening and melting of the material. Moca-cured elastomers are especially distinguished by the low temperature dependence of the modulus at from about $-30°$ C. to $130°$ C.; in particular; the modulus is virtually temperature-independent at from room temperature to $130°$ C.

Since however Moca was found, some years ago, to be carcinogenic in animal experiments, there have generally been great efforts to find alternatives to this dangerous material. A plurality of proposals have been made, but all the materials proposed are either too expensive or give unsatisfactory properties of the cured material. The cured materials show a greater decrease in modulus with increasing temperature, so that articles subjected to heat or to dynamic loads fail prematurely.

It has also already been proposed—in order to provide better control of the reactivity—to cure prepolymers of cycloaliphatic diisocyanates with aromatic diamines. For example, U.S. Pat. No. 3,766,148 discloses a process for the preparation of polyurethane elastomers, having improved resistance to hydrolysis, from 4,4'-methylene-bis-(cyclohexyl isocyanate), a polyol and 4,4'-diamino-diphenylmethane. It is true that elastomers prepared by this method have good resistance to hydrolysis, but they are characterized by a pronounced and virtually uniform decrease in modulus over the entire temperature range from $-50°$ to $150°$ C. A plateau in the value of the modulus, in the particularly important range above room temperature, is not achieved at all with such an elastomer.

The FIGURE is a graph of curves depicting the dependency of the modulus of shear on temperature of the various compositions described in Examples 1, 1a, 2 and 2a below over the range of $-100°$ C. to $+170°$ C. The curves are numbered in correspondence with the Examples.

We have found that polyurethane-urea elastomers which do not suffer from the disadvantages described above and have a virtually temperature-independent modulus in the range from room temperature to about $130°$ C. can be prepared by curing prepolymers, possessing isocyanate end groups bonded to cycloaliphatic structures, with 3,3', 5,5'-tetramethyl-4,4'-diaminodiphenylmethane.

Accordingly, the present invention relates to a polyurethane-urea elastomer prepared by reacting (A) a prepolymer which possesses terminal NCO groups bonded to a cycloaliphatic structure, which prepolymer has for its part been obtained by reacting an essentially difunctional polyhydroxy compound having a molecular weight of from 600 to 10,000, with or without a low molecular weight polyhydroxy compound having a molecular weight of less than 300, and an organic diisocyanate possessing at least one NCO group bonded to a cycloaliphatic structure, in amounts which provide a ratio of total OH:NCO groups of from 1:1.2 to 1:10, with (B) 3,3',5,5'-tetramethyl-4,4'-diamino-diphenylmethane, A and B being reacted in the molar ratio of from about 1:0.8 to 1:1.2.

The invention further relates to a process for the preparation of a polyurethane-urea elastomer, wherein (A) a prepolymer which possesses terminal NCO groups bonded to a cycloaliphatic structure, which prepolymer has been obtained by reacting a predominantly difunctional polyhydroxy compound with terminal hydroxyl groups and having a molecular weight of from about 600 to 10,000, with or without a low molecular weight polyhydroxy compound having a molecular weight of less than 300, and an organic diisocyanate possessing at least one NCO group bonded to a cycloaliphatic structure, in amounts which provide a ratio of total OH:NCO groups of from about 1:1.2 to 1:10, and (B) 3,3',5,5'-tetramethyl-4,4'-diamino-diphenylmethane, are mixed with one another in the molar ratio of from about 1:0.8 to 1:1.2, and the mixture is poured into a mold and allowed to cure.

Surprisingly, the polyurethane-urea elastomers prepared according to the invention have greatly improved temperature characteristics.

Suitable relatively high molecular weight polyhydroxy compounds for the preparation of the polyurethanes of the invention are the conventional polyesters, polyester-amides, polyethers, polyacetals and/or butadiene oils possessing terminal hydroxyl groups and having molecular weights of from 600 to 10,000, preferably from 800 to 3,000. The use of linear hydroxyl-containing polyesters and polyethers is preferred. The polyhydroxy compounds must be at least predominantly linear, i.e. they must be of difunctional structure for the purpose of the isocyanate reaction. If a proportion of polyhydroxy compounds of higher functionality is also present, the amount must be limited to give an average functionality of the mixture of from 2.0 to 2.2, preferably from 2.0 to 2.1. The said polyhydroxy compounds may be used either singly or in the form of mixtures with one another.

Suitable hydroxyl-containing polyesters and polyester-amides may be prepared, for example, from dicarboxylic acids of 2 to 12 carbon atoms and polyhydric alcohols, in the presence or absence of aminoalcohols or diamines. Examples of suitable dicarboxylic acids are aliphatic dicarboxylic acids, eg. succinic acid, glutaric acid, adipic acid, suberic acid, azelaic acid and sebacic acid, and aromatic dicarboxylic acids, eg. phthalic acid, isophthalic acid and terephthalic acid. The dicarboxylic acids may be used either singly or as mixtures. Aliphatic dicarboxylic acids, eg. adipic acid and succinic acid, are preferred.

In preparing the hydroxyl-containing polyesters it may be advantageous to employ, in place of the free carboxylic acids, the corresponding carboxylic acid derivatives, eg. carboxylic acid esters in which the alcohol radical is of 1 to 4 carbon atoms, carboxylic acid anhydrides or carboxylic acid chlorides. Examples of polyhydric alcohols are glycols of 2 to 16, preferably 2 to 6, carbon atoms, eg. ethylene glycol, diethylene glycol, butane-1,4-diol, pentane-1,5-diol, hexane-1,6-diol, decane-1,10-diol, 2,2-dimethylpropane-1,3-diol, 2,2,4-trimethylpropane-1,3-diol, propane-1,2-diol, propane-1,3-diol, dipropylene glycol and tripropylene glycol. Depending on the desired properties, the polyhydric alcohols may be used singly or as mixtures with one another or as mixtures with small amounts of diamines or aminoalcohols, eg. ethylenediamine, 1,4-diaminobutane, piperazine or ethanolamine. Further suitable compounds are esters of carbonic acid with the said diols, especially those of 4 to 6 carbon atoms, eg. butane-1,4-diol and/or hexane-1,6-diol, condensation products of ω-hydroxycarboxylic acids, eg. ω-hydroxycaproic acid, and, preferably, polymerization products of cyclic lactones, for example substituted or unsubstituted ε-caprolactones.

Suitable polyethers with terminal hydroxyl groups can be prepared by reacting one or more alkylene oxides, where alkylene is of 2 to 4 carbon atoms, with a starter molecule which contains several, preferably two, active hydrogen atoms. Examples of suitable alkylene oxides are ethylene oxide, propylene oxide, epichlorohydrin, 1,2-butylene oxide and 2,3-butylene oxide. The alkylene oxides may be used singly, alternately or as mixtures. Examples of suitable starter molecules are water, aminoalcohols, eg. N-alkyldiethanolamines, and diols, eg. ethylene glycol, propylene glycol, butanediol and hexanediol. Further suitable polyether-ols are the hyroxyl-containing polymerization products of tetrahydrofuran. The hydroxyl-containing polyethers, like the above polyesters, are predominantly linear, ie. of difunctional structure. Suitable polyacetals are, in particular, water-insoluble formals, eg. polybutanediol-formal and polyhexanediolformal.

A proportion of low molecular weight polyhydroxy compounds with molecular weights of less than 300, preferably from 60 to 300, may or may not be admixed to the polyhydroxy compounds of relatively high molecular weight. In general, the molar ratio of the polyhydroxy compounds of relatively high molecular weight to those of low molecular weight should not be less than 1:1, since otherwise the viscosity may easily be able to rise excessively. Examples of polyhydroxy compounds with molecular weights of less than 300 are butanediol, hexanediol, diethylene glycol, triethylene glycol, dipropylene glycol and tripropylene glycol.

The use of butanediol and diethylene glycol is preferred.

Organic diisocyanates suitable for the preparation of the polyurethane-urea elastomers of the invention must possess at least one isocyanate group, bonded to a cycloaliphatic structure, in the molecule. Examples of suitable diisocyanates are methylcyclohexyl diisocyanates, eg. 2,4- and 2,6-methyl-cyclohexyl diisocyanate, phenyl-cyclohexylmethane diisocyanates and, preferably, the various isomers of dicyclohexylmethane diisocyanate and of 3-isocyanato-methyl-3,5,5-trimethylcyclohexyl isocyanate (IPDI). Mixtures of these diisocyanates may also be employed. Aliphatic diisocyanates are unsuitable for the preparation of the polyurethanes of the invention.

The reaction of the polyhydroxy compounds of relatively high molecular weight, with or without low molecular weight polyhydroxyl compounds, with the organic diisocyanate or with several of the above organic diisocyanates to give a prepolymer possessing thermal isocyanate groups is carried out in the conventional manner at from 80° to 150° C., preferably from 80° to 120° C. If desired, the conventional catalysts, eg. tertiary amines, tin compounds and the like, may also be added, to accelerate the reaction.

The molar ratio of the relatively high molecular weight polyhydroxy compound, with or without low molecular weight polyhydroxy compound, to the organic diisocyanate is from 1:1.2 to about 1:10, preferably from 1:1.5 to 1:5, depending on the desired hardness of the end product. However, the molar ratio of polyhydroxy compound to diisocyanate should not be less than 1:1.2, since otherwise the viscosity will rise excessively and the mixtures will as a result be difficult to process. It is also possible first to react the polyhydroxy compound with only a proportion of the diisocyanate, or with one of the diisocyanates, to give a prepolymer, and to add the remainder subsequently.

To prepare the prepolymer, the polyhydroxy compound of relatively high molecular weight is dehydrated in the conventional manner by treatment at an elevated temperature under reduced pressure and is then reacted, with or without admixture of the low molecular weight polyhydroxy compound, with the organic diisocyanate. In the case of sizeable batches it can be advantageous, for better control of the reaction, to start with the organic diisocyanate and run the polyhydroxy compound continuously into the reactor. In that case it is advantageous to dehydrate the polyhydroxy compound of relatively high molecular weight separately beforehand.

The finished NCO-containing prepolymers can be processed further, with 3,3',5,5'-tetramethyl-4,4'-diaminodiphenylmethane, directly after their preparation; however, since they have an excellent shelf life they can also be stored for a lengthy period in the absence of atmospheric moisture, without undergoing a change in properties. If the prepolymer containing NCO groups is not to be processed further directly after its preparation it is advisable, before mixing it with the diamine, to free it from dissolved gases by a reduced pressure treatment at an elevated temperature, since castings containing bubbles may otherwise easily result. This measure is conventionally used when casting non-cellular polyurethanes.

When reacting the prepolymer with the 3,3',5,5'-tetramethyl-4,4'-diamino-diphenylmethane, approximately molar equivalent amounts should be employed; accordingly, the ratio of isocyanate groups of the prepolymer to amino groups of the curing agent should in general be from 0.8 to 1.2, preferably about 1:1.

Processing is carried out by mixing the NCO-containing prepolymer, at from 80° to 120° C., preferably at about 100° C., with the previously molten 3,3',5,5'-tetramethyl-4,4'-diamino-diphenylmethane, homogenizing the mixture and pouring it into molds.

The castings are then cured, so as to complete the reaction, by heating for several hours at from about 80° to 150° C.

In general, the best results are obtained by heating at about 100° C. The duration of heating depends in the main on the temperatures employed; in general, from 2 to 12 hours suffice at from about 100° to 120° C.

Of course, all conventional assistants and additives may be added to the reaction mixture, examples being catalysts, retarders, dyes, pigments, organic or mineral fillers, aging retardants and hydrolysis retardants.

In addition to the known good mechanical properties of such materials, the polyurethane-urea elastomers prepared according to the invention have excellent resistance to hydrolysis and excellent low temperature properties; in particular, they are distinguished by the constancy of their modulus over a wide temperature range. They can therefore be used, without limitations, for a plurality of applications, for example for the manufacture of machine components, large and small rollers and gaskets.

The Examples which follow illustrate the invention.

EXAMPLE 1

Reaction according to the invention 180 g (0.2 mole) of a commercial polytetrahydrofuran (PTHF) possessing terminal OH groups are dehydrated in a reaction vessel, equipped with a thermometer and reduced pressure attachment for one hour at 100° C. and 20 mm Hg, whilst stirring. 66.7 g (0.3 mole) of IPDI are then added and the mixture is reacted for 2 hours at 100° C. to give a prepolymer having terminal NCO groups. The prepolymer is again briefly degassed by application of reduced pressure, and 25.4 g (0.1 mole) of molten 3,3',5,5'-tetramethyl-4,4'-diaminodiphenylmethane are then stirred in. After homogenizing, the pourable mixture is poured into preheated molds and is subjected to a heat after-treatment for 5 hours at 100° C.

Clear, transparent panels having a hardness of 85 Shore A (DIN 53,505), a tensile strength of 34.3 N/mm² (DIN 53,504) and a tear resistance of 48 N/mm (DIN 53,515) are obtained. The temperature dependence of the modulus of shear, measured by means of an automatic torsion pendulum at a frequency of 1 c/s, is shown in the Figure (curve 1). The glass transition temperature of this material is −54° C.; the modulus of shear is virtually independent of temperature over the industrially important range from room temperature to about 130° C. and only begins to show any pronounced decrease at above 150° C.

COMPARATIVE EXPERIMENT 1 a

The procedure followed is similar to that described in Example 1, but instead of 3,3',5,5'-tetramethyldiaminodiphenylmethane 19.8 g (0.1 mole) of 4,4'-diaminodiphenylmethane are used for chain extension. All other parameters are kept constant.

This sample has a hardness of 72 Shore A, a tensile strength of 16.3 N/mm², and a tear resistance of 21 N/mm.

The curve of the modulus of shear of these elastomers (curve 1 a in the Figure) shows, in contrast to the material obtained by the reaction according to the invention described above, a continuous decrease in modulus from the glass transition temperature of −51° C. to the final softening point above 150° C. Accordingly, the material is very temperature-sensitive and therefore unusable for general purposes.

COMPARATIVE EXPERIMENT 1 b

Example 1 is repeated, but using 180 g (0.2 mole) of PTHF, 50.46 g (0.3 mole) of hexane 1,6-diisocyanate and 19.8 g (0.1 mole) of 4,4'-diaminodiphenylmethane.

The reactivity of this mixture is so high that it cannot be processed manually after admixture of the amine.

The composition solidifies in the reaction vessel within a few seconds.

COMPARATIVE EXPERIMENT 1 c

Experiment 1 b, described above, is repeated using 180 g (0.2 mole) of PTHF, 42.1 g (0.25 mole) of hexane 1,6-diisocyanate and 12.7 g (0.05 mole) of 3,3',5,5'-tetramethyl-4,4'-diamino-diphenylmethane.

The result is the same as in Comparative Experiment 1 b; the mixture gels in the reaction vessel within a few seconds, so that it is no longer processable.

Comparative Experiments 1 b and 1 c show that aliphatic diisocyanates are unsuitable for the preparation of the polyurethane-urea elastomers of the invention.

EXAMPLE 2

Reaction according to the invention 283.2 g (0.32 mole) of PTHF are dehydrated and reacted with 136.2 g (0.52 mole) of a commercial technical-grade dicyclohexylmethane diisocyanate (® Hylene W from Dupont) for 2 hours at 110°–120° C., to give a prepolymer. 50.8 g (0.2 mole) of molten 3,3',5,5'-tetramethyl-4,4'-diamino-diphenylmethane are then stirred in and the mixture is homogenized, poured into preheated molds and post-cured for 5 hours at 110° C.

The material gives tough and transparent castings which have a Shore A hardness of 85, a tensile strength of 12 N/mm², an elongation at break of 500% and a tear resistance of 35 N/mm.

The curve of the modulus of shear in the Figure (curve 2) shows, similarly to Example 1, a wide temperature range from about 0° to 150° C. over which the modulus shows only slight temperature-dependence.

COMPARATIVE EXPERIMENT 2 a

The experiment in Example 2 is repeated, using 180 g (0.2 mole) of PTHF, 78.6 g (0.3 mole) of dicyclohexylmethane diisocyanate (Hylene W) and 19.8 g (0.1 mole) of 4,4'-diamino-diphenylmethane.

The curve of the modulus of shear in the Figure (curve (2a)) shows, similarly to Comparative Experiment 1 a, a continuous decrease in the modulus from −50° to 150° C. There is no plateau whatsoever in the value of the modulus. The heat resistance of this material is accordingly also inadequate.

EXAMPLE 3

Using the procedure described in Example 1, an elastomer is prepared using 180 g (0.2 mole) of PTHF, 55.6 g (0.25 mole) of IPDI and 12.7 g (0.05 mole) of 3,3',5,5'-tetramethyl-4,4'-diaminodiphenylmethane.

Clear, transparent panels having the following mechanical properties are obtained.

| Hardness | 57 | Shore A |
|---|---|---|
| Tensile strength | 16.8 | N/mm² |
| Tear resistance | 27.4 | N/mm |

The glass transition temperature of this material is −53° C.; the modulus of shear is virtually independent of temperature from room temperature to about 130° C.

EXAMPLE 4

180 g (0.2 mole) of PTHF are dehydrated as described above and reacted with 77.8 g (0.35 mole) of IPDI for 2 hours at 100° C., whilst stirring, to give a prepolymer. The melt is degassed and 38.5 g (0.15 mole) of molten 3,3,5,5'-tetramethyl-4,4'-diamino-diphenylmethane are stirred in at 100° C. The homogenized melt is poured into suitably prepared molds and is then subjected to a heat after-treatment for 5 hours at 100° C. Transparent panels having the following mechanical properties are obtained:

| Hardness | 92 | Shore A |
|---|---|---|
| Tensile strength | 34.9 | N/mm$^2$ |
| Elongation at break | 420 | % |
| Tear resistance | 56 | N/mm |

EXAMPLE 5

297.3 g (0.15 mole) of a polyester of adipic acid and ethylene glycol, having a molecular weight of 1,980, are dehydrated and reacted, by the method described above, with 70.75 g (0.27 mole) of a technical-grade diisocyanato-dicyclohexylmethane marketed under the name Hylene W and 29.0 g (0.114 mole) of 3,3',5,5'-tetramethyl-4,4'-diamino-diphenylmethane, to give an elastomer. The following mechanical properties are found:

| Hardness | 80 | Shore A |
|---|---|---|
| Tensile strength | 19.4 | N/mm$^2$ |
| Elongation at break | 670 | % |
| Tear resistance | 42.5 | N/mm |

The glass transition temperature of this material is −32° C.; the modulus of shear is constant from room temperature to 120° C.

EXAMPLE 6

250 g (0.125 mole) of PTHF of molecular weight 2,000 are dehydrated and reacted, as described above, with 41.65 g (0.187 mole) of isophorone diisocyanate to give a prepolymer having terminal isocyanate groups. 65.6 g (0.25 mole) of diisocyanatodicyclohexylmethane prepared by hydrogenating 4,4'-diaminodiphenylmethane and then phosgenating the product are added and the mixture is briefly degassed. 75.4 g (0.297 mole) of molten 3,3',5,5'-tetramethyl-4,4'-diamino-diphenylmethane are stirred in at 100° C. and the homogenized melt is poured into preheated molds and then subjected to a heat treatment of 24 hours at 110° C. The material has the following mechanical properties:

| Hardness | 97 | Shore A |
|---|---|---|
|  | 56 | Shore D |
| Tensile strength | 31.6 | N/mm$^2$ |
| Elongation at break | 420 | % |
| Tear resistance | 67.4 | N/mm |

The glass transition temperature of this material is −72° C.; the modulus of shear is virtually constant in the range from 0° to 170° C.

EXAMPLE 7

300 g (0.15 mole) of PTHF of molecular weight 2,000 are dehydrated and reacted with 76.8 g (0.3 mole) of phenylcyclohexylmethane diisocyanate, whilst stirring, for one hour at 80° C. and for one hour at 100° C. The melt is degassed and at the above temperature 36.2 g (0.143 mole) of molten 3,3',5,5'-tetramethyl-4,4'-diamino-diphenylmethane are stirred in; the mixture is homogenized, poured into preheated molds and then subjected to a heat treatment of 24 hours at 110° C. The material has the following properties:

| Hardness | 88 | Shore A |
|---|---|---|
| Tensile strength | 31.4 | N/mm$^2$ |
| Elongation at break | 560 | % |
| Tear resistance | 35 | N/mm |

The glass transition temperature of this material is −72° C.; the modulus of shear is independent of temperature at from 0° to 170° C.

We claim:
1. A polyurethane-urea elastomer having, a modulus of shear that is independent of temperature over the range 0° to 170° C. prepared by reacting
   (A) a prepolymer which possesses terminal NCO groups bonded to a cycloaliphatic structure, which prepolymer has for its part been obtained by reacting an essentially difunctional polyhydroxy compound having a molecular weight of from 600 to 10,000, with or without a low molecular weight polyhydroxy compound having a molecular weight of less than 300, and an organic diisocyanate possessing at least one NCO group bonded to a cycloaliphatic structure, in amounts which provide a ratio of total OH:NCO groups of from 1:1.2 to 1:10, with
   (B) 3,3',5,5'-tetramethyl-4,4'-diamino-diphenylmethane, A and B being reacted in the molar ratio of from 1:0.8 to 1:1.2.

2. A polyurethane-urea elastomer as claimed in claim 1, wherein the organic diisocyanate used is dicyclohexylmethane diisocyanate and/or 3-isocyanatomethyl-3,5,5-trimethylcyclohexyl isocyanate.

3. A process for the preparation of a polyurethane-urea elastomer, wherein
   (A) a prepolymer which possesses terminal NCO groups bonded to a cycloaliphatic structure, which prepolymer has been obtained by reacting a predominantly difunctional polyhydroxy compound with terminal hydroxyl groups and having a molecular weight of from about 600 to 10,000, with or without a low molecular weight polyhydroxy compound having a molecular weight of less than 300, and an organic diisocyanate possessing at least one NCO group bonded to a cycloaliphatic structure, in amounts which provide a ratio of total OH:NCO groups of from about 1:1.2 to 1:10, and
   (B) 3,3',5,5'-tetramethyl-4,4'-diamino-diphenylmethane, are mixed with one another in the molar ratio of from about 1:0.8 to 1:1.2, and the mixture is poured into a mold and allowed to cure.

4. A process as claimed in claim 3, wherein the organic diisocyanate used is dicyclohexylmethane diisocyanate, 3-isocyanatomethyl-3,5,5-trimethylcyclohexyl isocyanate or a mixture of these.

* * * * *